G. L. DANFORTH, Jr. & S. NAISMITH.
AIR COOLED HOLLOW SLAG POCKET.
APPLICATION FILED JAN. 24, 1916.
1,181,374.
Patented May 2, 1916.
2 SHEETS—SHEET 1.
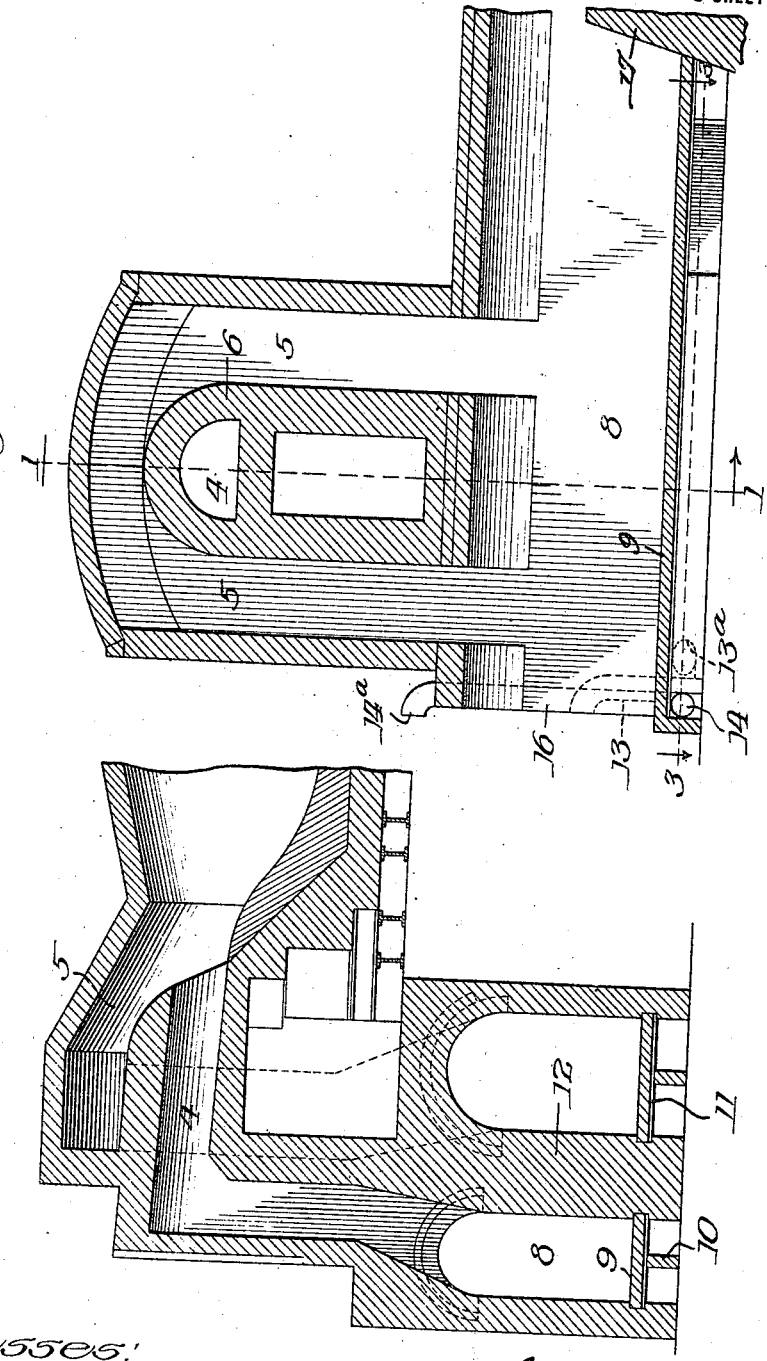

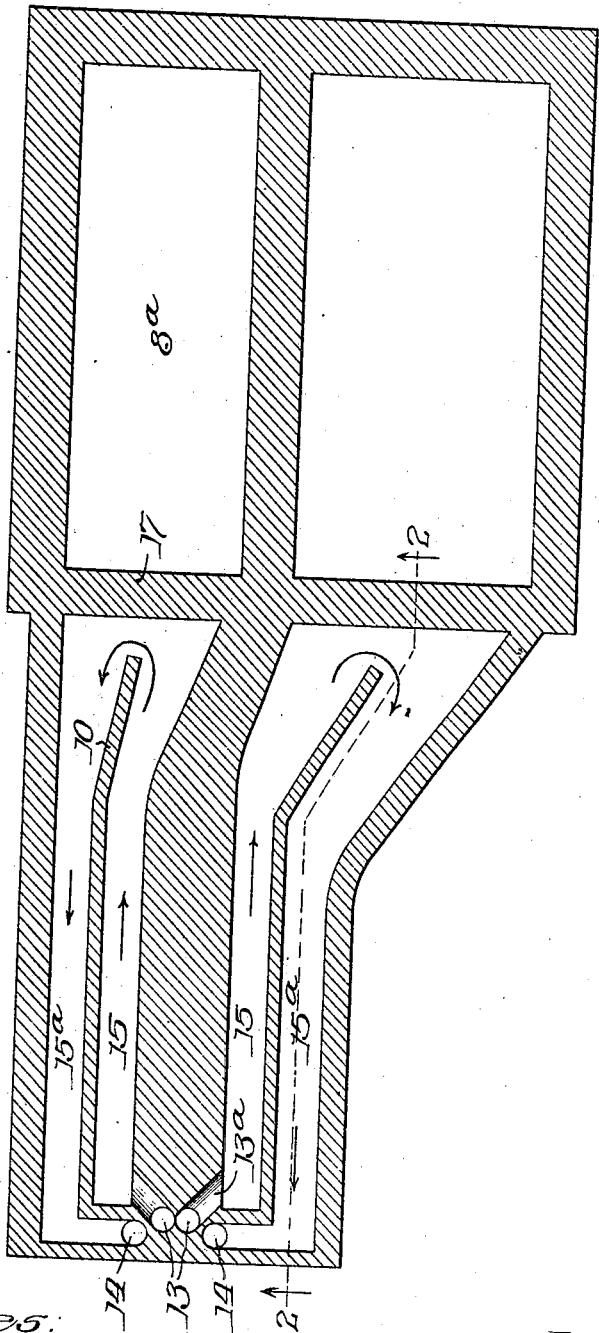

UNITED STATES PATENT OFFICE.

GEORGE L. DANFORTH, JR., AND SAMUEL NAISMITH, OF CHICAGO, ILLINOIS.

AIR-COOLED HOLLOW SLAG-POCKET.

1,181,374.  Specification of Letters Patent.  Patented May 2, 1916.

Application filed January 24, 1916. Serial No. 73,871.

*To all whom it may concern:*

Be it known that we, GEORGE L. DANFORTH, Jr., and SAMUEL NAISMITH, citizens of the United States, and residents of Chicago, in the county of Cook and State of Illinois, have invented certain new and useful Improvements in Air-Cooled Hollow Slag-Pockets, of which the following is a specification.

Our invention relates to improvements in furnaces or regenerators, and particularly to means for cooling the slag pockets thereof by circulating cold air therebeneath.

The slag pockets, which are virtually but enlarged flues leading from the uptakes and ports to the checker chambers, act to collect the melted brickwork from above and to intercept the fine particles of dolomite, limestone, ore, silica, etc., carried over by the gases in their passage to the checker chambers. They also serve in some cases to take the slag should the heat of steel in furnace boil or froth excessively. By the use of slag pockets there is avoided the constant cleaning out of the checkerwork that would otherwise be necessary.

Slag pockets are a source of great trouble in every furnace, yet a furnace cannot be operated successfully without them.

An object of our invention is to keep the bottoms of the slag pockets cool by circulating air under a false bottom in the slag pockets. We obtain this circulation of cold air by providing flues or any kind of opening beneath the false bottom of the slag pockets and by connecting said flues, or openings, with a stack or other means of inducing the necessary draft. In this way the bottom of the slag pocket is cooled and the slag contained therein, instead of remaining liquid and undermining the slag pocket walls, allowing the same to sag and open at the brick joints, is chilled and has been found to form in thin layers. It is much more readily removed than when it remains liquid to a considerable depth and finally chills in very thick layers that strongly adhere to the slag pocket walls when the slag is liquid.

By our invention there is accomplished two material improvements; first, the walls of the slag pockets are maintained in much better condition, and, secondly, the accumulated slag is finally removed at much less expense and with less lost time in the furnace operation.

Our invention further comprises the details of construction and arrangement of parts hereinafter described and claimed, reference being had to the accompanying drawings, in which:

Figure 1 is a vertical section on the line 1—1 of Fig. 2 through the gas and air slag pockets on one end of an open hearth furnace equipped with our invention; Fig. 2 is a longitudinal section through the air slag pocket, and Fig. 3 is a horizontal section through the slag pockets on one end of the furnace (the opposite end being the same the section being taken on the line 3—3 of Fig. 2.)

We have illustrated our invention in connection with an open hearth furnace equipped with a gas port 4, having an air port 5 on each side of it, separated by a brick wall 6. These ports and downtakes lead from the furnace proper to the slag pockets 8.

In the form preferred to be shown we form a false bottom 9 in the lower portions of the slag pockets 8, by providing plates 11 carrying bricks let into the walls 12. To furnish additional support to the floor 9, we form a wall 10 extending through the central portion of the slag pockets but terminating short of the bridge wall 17, separating the slag pockets 8 from the checker chambers 8$^a$. At the other end, the wall 10 is joined to the wall 12, thus forming substantially two compartments, or flues, 15 in the bottom of every slag pocket. For creating a circulation of air through the compartments 15, we prefer to employ inlet pipes 13, directed to discharge through ducts 13$^a$ in wall 12, into the compartments 15. These pipes 13 at the other ends are open to the atmosphere, as best shown in Fig. 2. Connected into the other compartments 15$^a$ are exhaust pipes 14 connected to a chimney 14$^a$, which causes a draft through the compartments at all times, as indicated by the arrows in Fig. 3. For cleaning out the slag pockets 8, entrance is gained through the open end 16, which may be closed by a bulkhead (not shown).

It will be observed that we have provided an arrangement whereby the molten slag is quickly cooled in the slag pockets and consequently have made possible the quick and easy cleaning of the pockets. Thus the cutting away of the walls forming the pockets by allowing the slag to remain fluid therein is prevented.

We claim:

1. The combination with an open hearth furnace having gas and air flues, of slag pockets provided with false bottoms, walls extending longitudinally of said pockets under said bottoms, thereby providing a plurality of flues, and means for circulating air underneath said bottoms, substantially as described.

2. The combination with open hearth furnaces and the like, of slag pockets provided with elevated bottom walls, intermediate walls supporting said bottoms and extending longitudinally of said pockets forming flues, air connections to said flues and means for causing circulation of air therethrough, substantially as described.

3. In combination with open hearth furnaces and the like, of walls forming slag pockets, said pockets being provided with raised bottoms, ribs supporting said bottoms and extending longitudinally of said pockets, and at one end joined to one of the walls of said pockets forming flues, air inlets connected to one set of flues and exhaust pipes connected to the other set of flues, substantially as described.

4. The combination with a metallurgical furnace, of walls forming a slag pocket, the wall forming the floor of said pocket being provided with a conduit, and means for circulating a cooling medium through said conduit, whereby fluid material deposited in said pocket is quickly cooled and prevented from causing deterioration of said walls, substantially as described.

Signed at Chicago, Illinois, this 15th day of January, 1916.

GEORGE L. DANFORTH, Jr.
SAMUEL NAISMITH.

Witnesses:
M. J. DEVANEY,
A. F. WHITE.

Copies of this patent may be obtained for five cents each, by addressing the "Commissioner of Patents, Washington, D. C."